Dec. 7, 1954    P. FOURON ET AL    2,696,082
ROTARY DISTRIBUTING VALVE CONTROL APPARATUS
Filed June 23, 1953    6 Sheets-Sheet 1

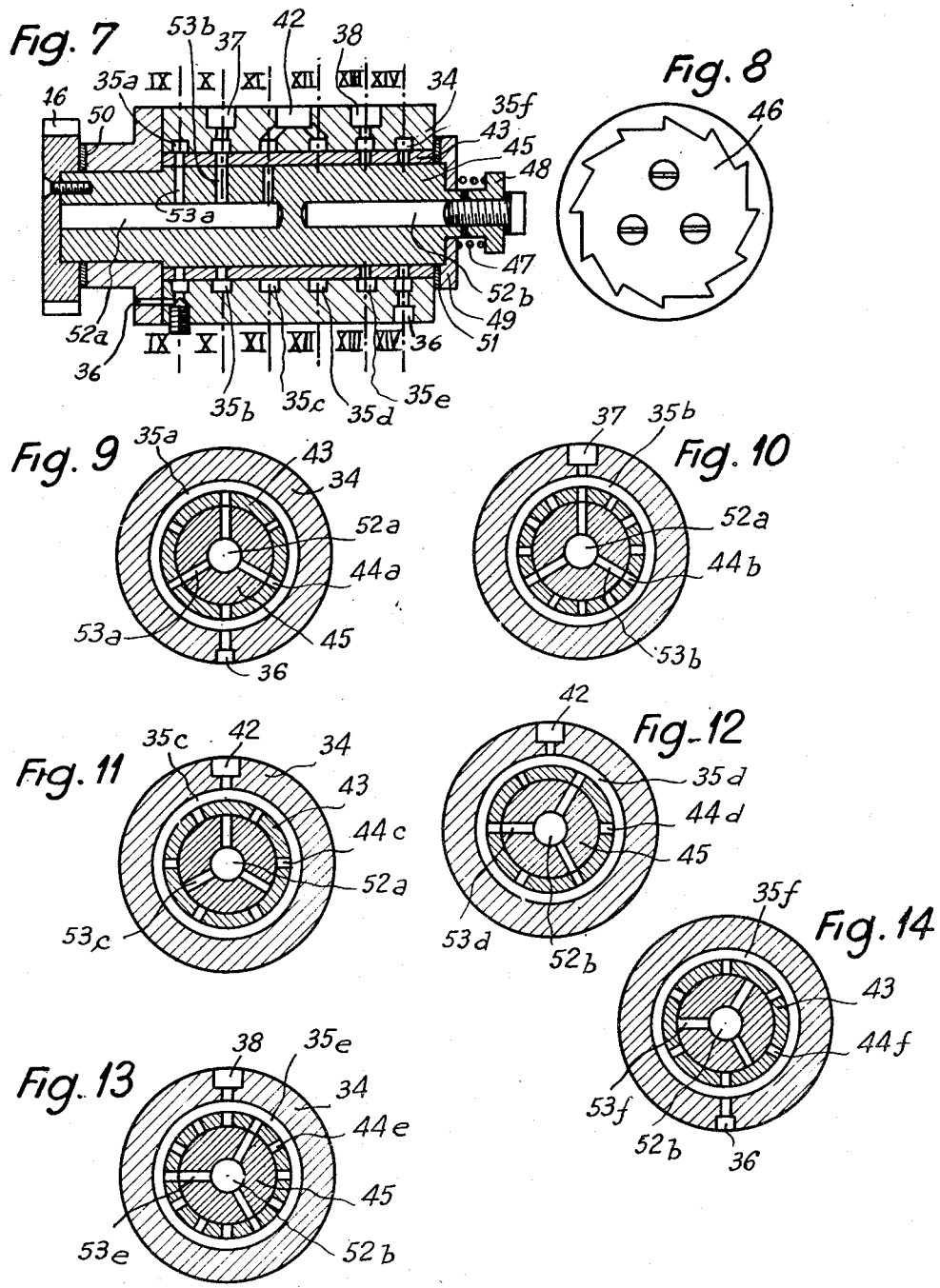

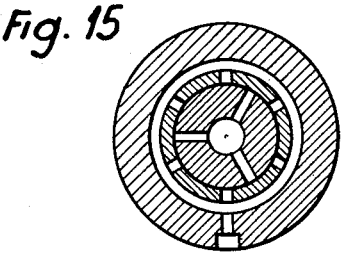
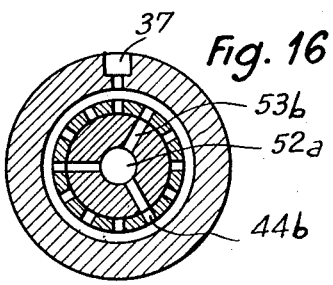
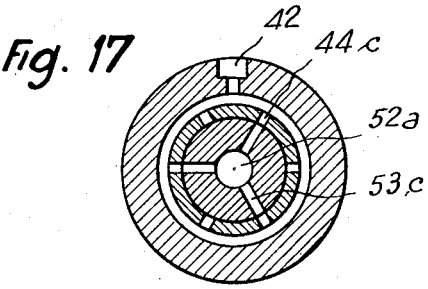
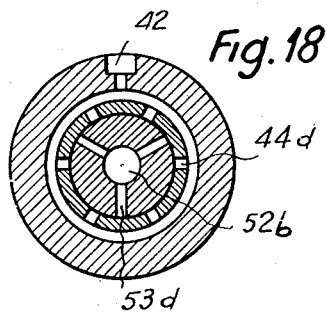
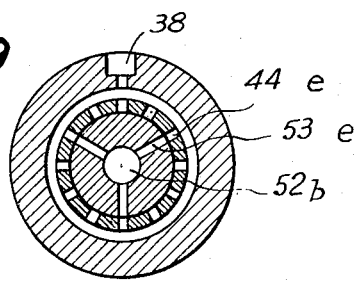
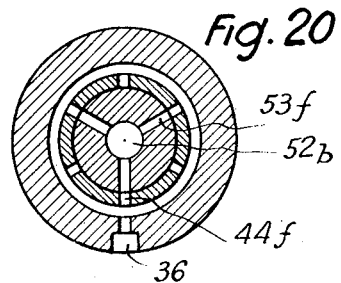

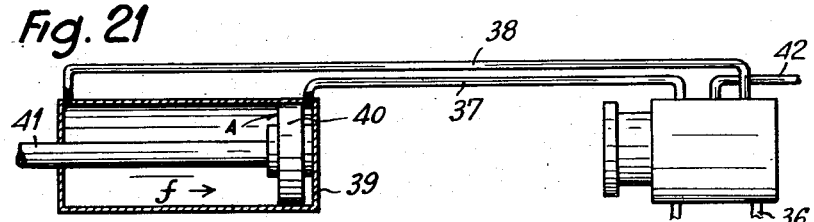
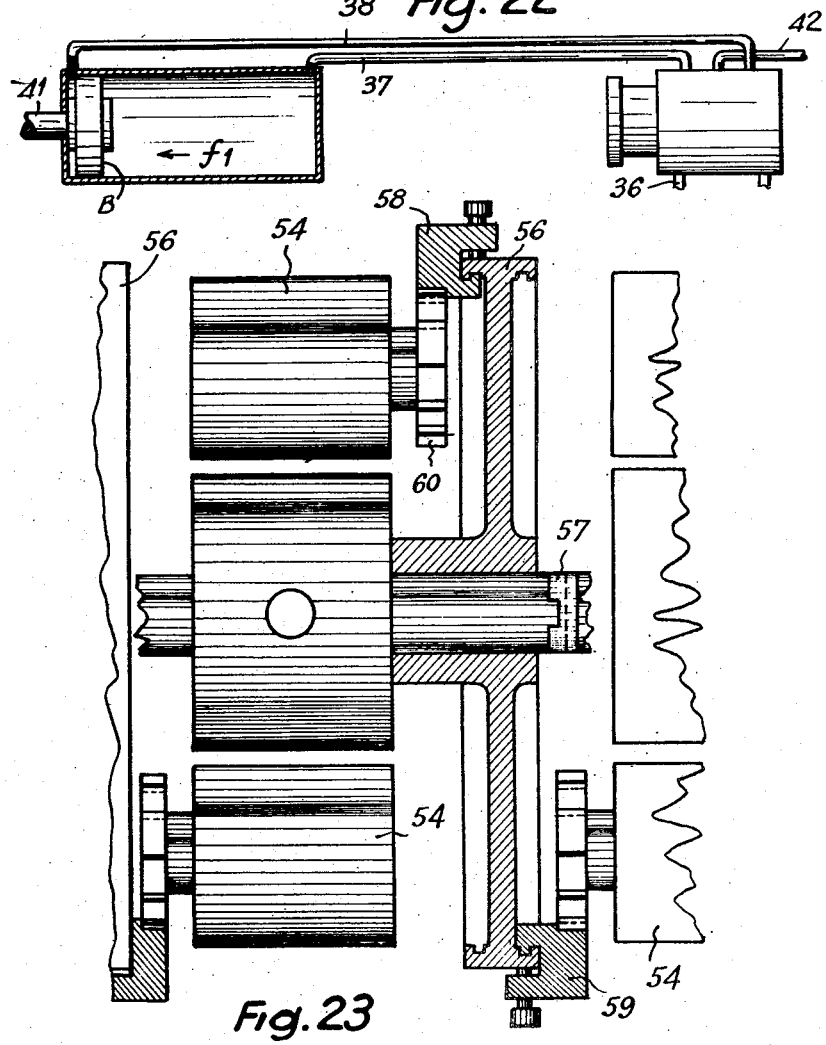

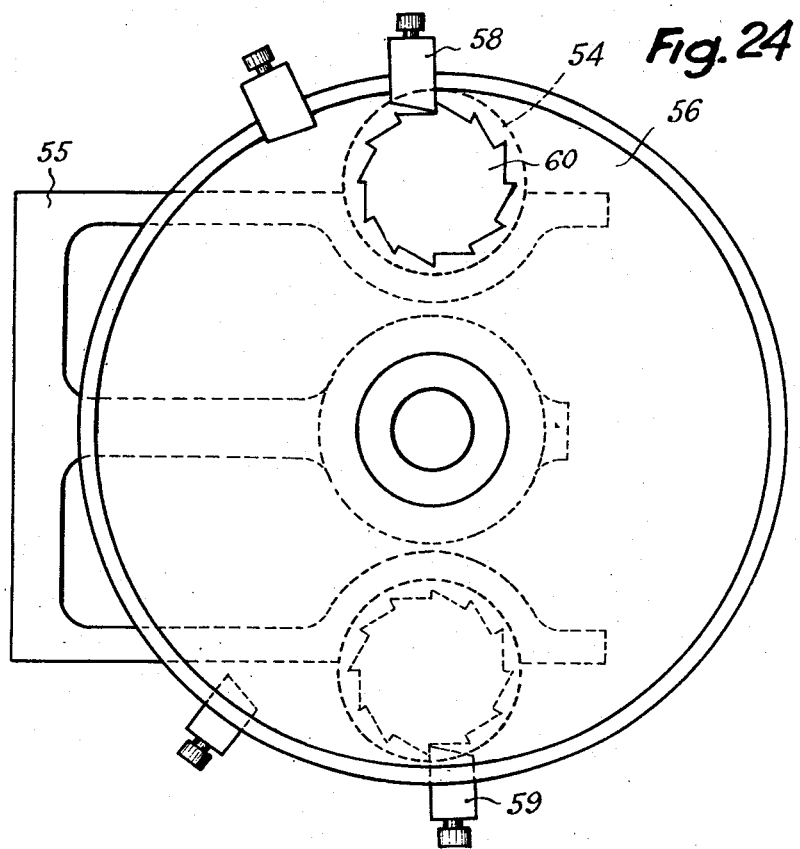

United States Patent Office 2,696,082
Patented Dec. 7, 1954

2,696,082

ROTARY DISTRIBUTING VALVE CONTROL APPARATUS

Pierre Fouron, Chatenay-Malabry, and Georges Bourret, Boulogne (Seine), France, assignors to Societe Civile d'Etudes pour Materiel de Fonderie, Bagneux (Seine), France Application June 23, 1953, Serial No. 363,629

Claims priority, application France July 1, 1952

10 Claims. (Cl. 60—97)

The present invention relates to the remote control of apparatus driven by means of a compressed fluid and it has for its object an improved remote control arrangement for such apparatus and particularly for mechanism operating the different parts of a machine-tool, for example.

Mechanical arrangements are already known which ensure such a control and which comprise members fixed on a shaft rotating with a practically constant speed and carrying lugs adapted to actuate, during the rotation of the shaft, pivoted fluid distributors feeding the apparatus to be controlled. In these arrangements it is practically necessary to provide a first lug-carrying member, such as for example a disc, in order to ensure the pivoting of a distributor in one direction and a second lug-carrying member in order to bring the distributor back to its initial position. Besides, the control of these distributors cannot take place when the shaft is not rotating.

The present invention has for its object particularly a mechanical arrangement ensuring the remote control of apparatus driven by means of a compressed fluid which is free from the above-mentioned drawbacks.

According to the invention, we provide a mechanical arrangement for the remote control of apparatus driven by means of a compressed fluid, comprising rotative distributors for the compressed fluid, at least one member constituted, for example, by a disc or plate, carrying adjustable actuating lugs for operating these distributors and means for displacing these lugs relatively to the distributors so that the latter turn through a certain angle for the purpose of modifying the distribution of the compressed fluid, the adjustment of the position of the lugs with respect to the member carrying them being capable of modification so as to allow the moment at which the distributors are actuated to be varied as may be desired.

The member carrying the lugs may be movable about an axis parallel to those of the distributors so that, when it rotates it actuates the latter. This lug-carrying member may also be fixed, the assembly of the distributors rotating about an axis parallel to those of the latter. The lugs may be fixed with respect to the member carrying them or, on the contrary, be capable of a limited displacement, means being then provided for displacing the lug, this permitting control of a distributor when the carrying member is stopped with respect to the assembly of the distributors.

The distributors being adapted to rotate, the lugs operating a distributor are all identical and any number may be fixed on the carrying member, as may be desired; it is therefore possible to actuate a given distributor as many times as it is desired in a cycle of operations and, consequently, to cause an apparatus which is fluid-driven to function several times during a same cycle.

When the apparatus to be controlled constitutes a double acting cylinder, a single four-way distributing valve is preferably provided to feed the fluid to this cylinder.

The member carrying the lugs may be provided with the lugs operating all the distributors or a certain number only of the latter. In order that a given lug should actuate only one distributor, one can, for example, give to the lugs different heights. One can also control two distributors only with one lug-carrying member, the lugs corresponding to one of the distributors being placed on one of the faces of this member and the lugs corresponding to the second distributor being placed on the other face of the said member.

The invention has also for its object a distributor particularly applicable to the arrangement described above. This distributor comprises essentially a body containing a socket in which is rotatively mounted a core or plug provided with radial and lateral passages capable of connecting or disconnecting, by means of orifices provided in the socket, annular recesses in the body connected to passages for the admission, the exhaust or the utilization of a compressed fluid.

Finally, the invention has for its object a rotative machine adapted to be used particularly for casting in chilled moulds and more generally for any cyclic operation, comprising a rotative plate carrying the different apparatus required for the intended operation, distributors of fluid under pressure, of a rotary type, for controlling the said apparatus and carried by the rotative plate, actuating lugs carried by the fixed frame of the machine to operate these distributors, and means for causing the said plate to rotate in an intermittent manner.

The machine advantageously comprises also rotary distributors carried by the frame and capable of being actuated by actuating lugs carried by a plate rotating continuously, which distributors may be connected to jacks the rods of the pistons of which carry actuating lugs for the distributors mounted on the rotative plate previously mentioned.

Referring now to the accompanying drawings, in which are represented, in the way of examples only, various preferred embodiments of the invention:

Fig. 7 is an axial section of a distributor;

Fig. 8 is an end view of it;

Figs. 9 to 14 are sections along IX—IX, X—X, XI—XI, XII—XII, XIII—XIII and XIV—XIV of Fig. 7, respectively;

Figs. 15 to 20 are views similar to those of Figs. 9 to 14 for another position of the distributor;

Figs. 21 and 22 represent the connection of the distributor with a double acting jack;

Figs. 23 and 24 represent another embodiment of the controlling arrangement according to the invention.

Figs. 1 to 6 represent a rotative machine intended for the manufacturer of chill-mould castings and provided with controlling arrangements according to the invention.

Figure 1:
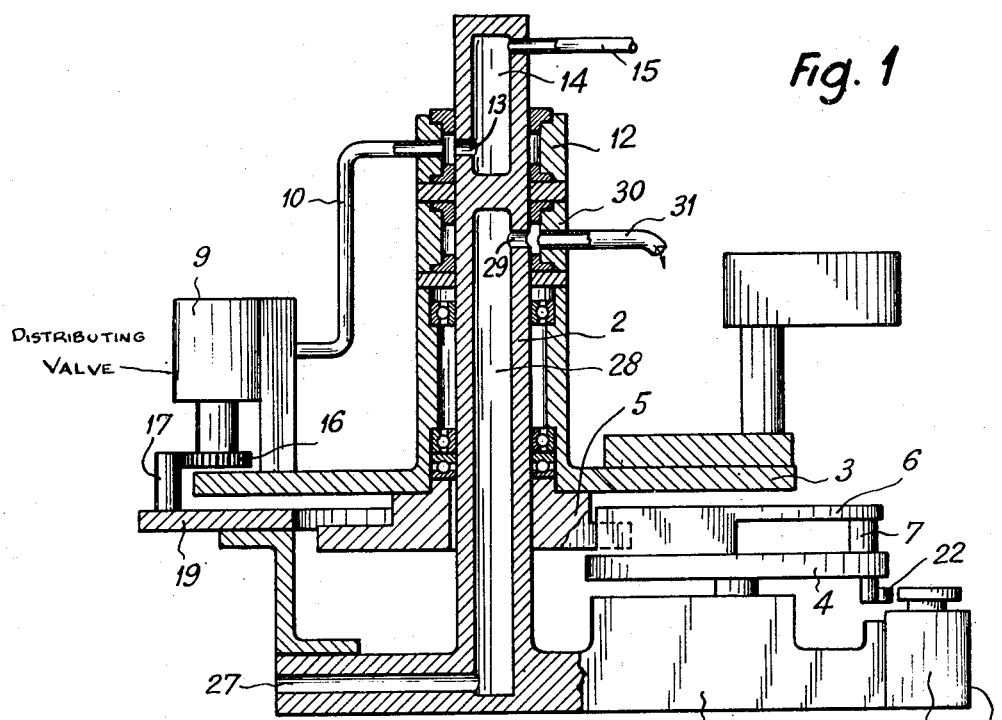
Fig. 1 is a vertical section of a rotary machine according to the invention.
Figure 2:
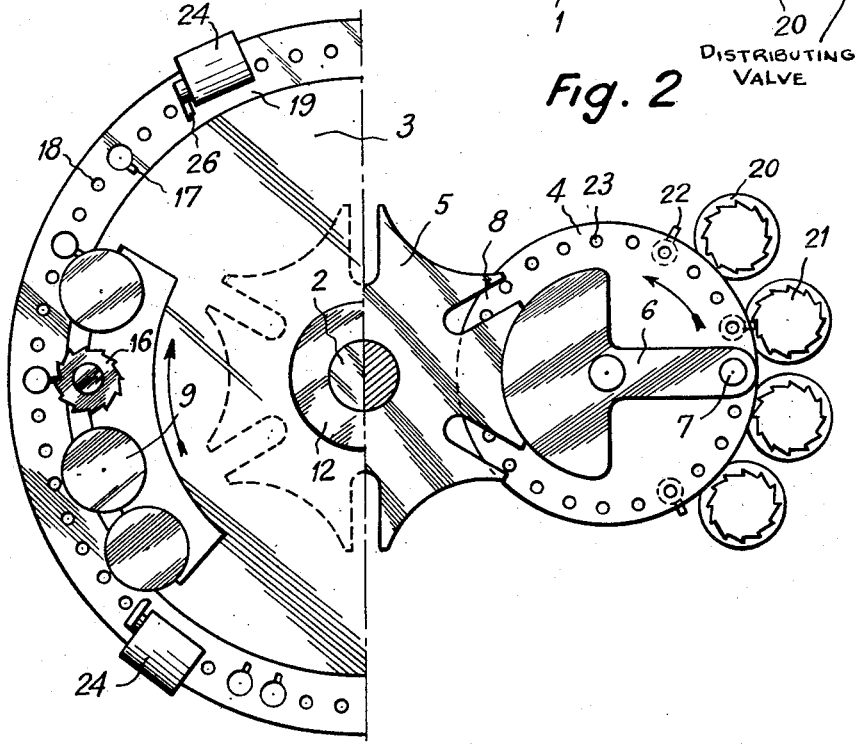
Fig. 2 is a plan of it, certain parts being supposed to be removed from the right hand half.

This machine comprises essentially a base 1 solid with a column 2 round which is mounted rotatively a plate 3. This plate which is intended to receive the different moulds in which the pieces are cast, is connected by a Maltese cross device to a plate 4 driven in continuous rotation. The Maltese cross device comprises a Maltese cross 5 affixed to the plate 3 and an arm 6 which is affixed to the plate 4 and carries a finger 7 capable of engaging the grooves 8 of the Maltese cross; the arm 6 has the shape of a sector at its end opposite to the finger 7 so as to ensure by its connection with the cross 5 the locking of the latter. Owing to this arrangement, the plate 3 rotates with an intermittent motion.

The different parts of the moulds are operated by a compressed fluid which is fed to them by rotary distributors 9 fixed on the plate 3. These distributors, a suitable number of which is provided, are connected by a passage 10 to a feeding device 12 affixed to the plate 3, this supply container communicates through an orifice 13 with a recess 14 in the column, connected to a feed pipe 15.

Figure 3:
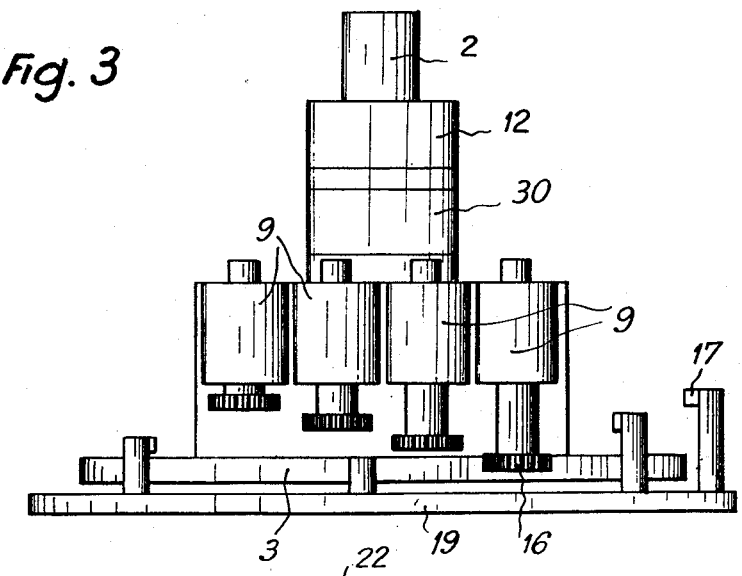
Fig. 3 represents the distributors carried by the rotative plate and their actuating lugs in elevation.

The distributors 9 comprise at their lower portion a driving ratchet wheel 16. Lugs or pins 17 are removably mounted in holes 18 provided to this end in a circular crown 19 affixed to the base 1, so that they are engaged by the ratchet wheels when the plate 3 rotates and causes these wheels to turn. The height at which the ratchet wheels and the lugs are situated varies according to the wheel and to the lug, as it is seen in Fig. 3 so that one pin or lug 17 actuates a distributor and only one.

Figure 4:
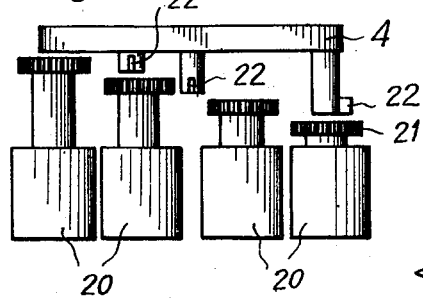
Fig. 4 represents in elevation the fixed distributors and their actuating lugs.

Other distributors 20 are also provided, fixed on the base and comprising at their upper portion ratchet wheels 21 capable of being actuated by the lugs 22 mounted in the holes 23 of the plate 4. As in the case of the distributors 9, the height of the lugs and of the ratchet wheels varies according to the wheel and the lug (Fig. 4).

Figure 5:
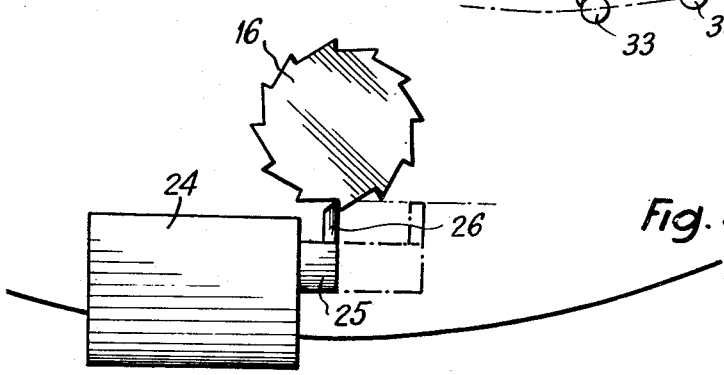
Fig. 5 is a plan of a detail.

The distributors 20 may either serve for the actuating of parts of the machine which do not turn with the plate 3, or of parts which turn with this plate, actuation of which, in this latter case, takes place when the plate is stopped. To this end, some of the distributors 20 are connected to jacks 24 fixed on the crown 19 and the piston rod of which, 25, carries a lug or finger 26 (Fig. 5), the position of the jack and of the lug or finger being such that when the lug or finger moves at a suitable instant it can advance the ratchet wheel 16 of one of the distributors 9.

The moulds are heated with gas arriving by a passage 27 provided in the base 1, the gas then flowing into a recess 28 of the column 2, which forms a container. The recess 28 is connected by an orifice 29 to a feeding device 30 which is fastened to the plate 3 and is itself connected to the moulds by piping 31.

The machine functions in the following manner: the driving circular plate 4, being rotating continuously, ensures the intermittent rotation of the movable plate 3 carrying the moulds. During the rotation of the latter, the ratchet wheels 16 are engaged by the lugs 17, which actuates the distributors and ensures the control of the different parts of the moulds. Meanwhile, the plate 4 actuates the distributors 20 by means of its lugs 22. These distributors then actuate on the one hand the parts of the machine which do not turn with the plate 3 and on the other hand the jacks 24 which actuate then some of the distributors 9 during a period of stoppage of the plate 3.

The different operations of each of the units taking place at a precise moment with respect to the casting operation (these operations being variable as to time and as to sequence according to the piece being cast) and the position of the pins 17 and 22 and of the devices 24 being adjustable, it is possible to cause all the movements consistent with the working of the moulds at the required moment.

Figure 6:
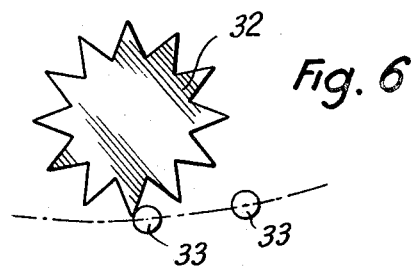
Fig. 6 is a similar view of an alternative arrangement.

Instead of ratchet wheels, one could also use for example star wheels 32 (Fig. 6) the actuating lugs or fingers having then the form of rods 33.

There is represented in Figs. 7 to 20 a distributor particularly adapted to the controlling arrangement according to the invention. This distributor consists of a body 34 of steel or cast iron comprising a bore and annular grooves 35a, 35b ... 35f. The grooves 35a and 35f communicate with exhaust passages 36; the grooves 35b and 35e communicate with passages 37 and 38 connected to the two ends of a double acting cylinder 39 in which moves a piston 40 the rod of which, 41, is connected to the part to be actuated; finally, the grooves 35c and 35d communicate with a passage for the admission of the compressed fluid, 42.

In the body 34 is fixed a sleeve 43 provided with a series of holes 44a, 44b ... 44f, each series of holes opening in the corresponding annular groove. The exhaust holes 44a and 44f are equal in number to the admission holes 44c and 44d but are situated in different radial planes; the holes 44b and 44e are twice as numerous as the former ones.

Inside the sleeve 43 is disposed a core or plug 45 having affixed to one of its ends a ratchet wheel 16, or of a star wheel or similar member. A spring 47, interposed between a flange 48 of the core or plug and a cap 49, maintains resiliently the core or plug in place and exerts a braking action thereon. The references 50 and 51 designate joint packings.

The core or plug 45 is axially bored at both ends at 52a and 52b and is provided with passages 53a, 53b ... 53f situated in the transverse planes of the grooves 35a, 35b ... 35f; the passages 53a, 53b, and 53c open out into the passage 52a, the others into the passage 52b.

Each series of passages 53a, 53b ... 53f comprises a number n passages which is at least three as in the example illustrated in order to balance the pressures exerted by the fluid in motion and to avoid abnormal pressures between the core or plug 45 and the sleeve 43. The number of holes in each series of holes 44a, 44b ... 44f is equal to p or 2p, as the case may be, p being equal to 2n or to a multiple of this number; the ratchet wheel 46 has 2p teeth.

In the position of the distributor represented in Figs. 7 to 14, the driving fluid passes from the passage 42 into the passage 52b by the orifices 44d and the passages 53d (Fig. 12). It arrives then in the cylinder 39 by the passages 53e, the orifices 44e and the passage 38, acting on the face A of the motor piston 40 and displacing the latter in the direction of the arrow f (Fig. 21). At the same time, the fluid happening to be in the opposite end of the motor cylinder 39 escapes from it by the pipe 37, the orifices 44b and the passages 53b (Fig. 10), the passage 52a, the passage 53a, the orifices 44a and the pipe 36.

When an actuating pin meets the ratchet wheel 46, it causes the core or plug 45 to turn through 30°, this core or plug occupying then the position represented in Figs. 15 to 20. In these conditions, the driving fluid passes successively through the orifices 44c, the passages 53e (Fig. 17), the passage 52a, the passages 53b, the orifices 44b (Fig. 16) and the pipe 37 to act upon the face B of the piston and displace the latter in the direction of the arrow f1. At the same time, the fluid happening to be at the opposite end of the cylinder escapes from it by the piping 38, the orifices 44e and the passages 53e (Fig. 19), the passage 52b, the passages 53f, the orifices 44f and the pipe 36 (Fig. 20).

When a subsequent displacement of the ratchet wheel 46 takes place through the action of an actuating lug, the initial distribution is re-established and the piston moves again in the direction of the arrow f.

It is evidently possible to obtain other movements of the fluid by the combinations of holes provided on the one hand in the sleeve 43 and on the other hand in the core or plug 45.

As example, one may obtain the following operations:
1st phase: Admission on the face A of the piston 40 of the jack 39. Exhaust on the face B.
2nd phase: Admission on the face B of the piston. Exhaust on the face A.
3rd phase: Exhaust sides A and B.
One can also obtain:
1st and 2nd phases: As above.
3rd phase: Admission sides A and B.

The Figs. 23 and 24 represent another arrangement for the control according to the invention. Distributors 54, of the type which has just been described for example, the number of which is equal to that of the parts to be controlled, are fixed on a support 55. Rotary plates 56, the number of which is equal to one half of that of the distributors, are connected to each other by Oldham couplings 57 or similar devices and carry on each of their faces adjustable catches 58, 59, which cause ratchet wheels 60, controlling the distributors 54, to turn through a certain angle.

It is possible to increase or to diminish the number of pairs of distributors according to the number of parts the working of which must be provided for.

This assembly enables one to obtain the different movements which take place in a machine according to a given cycle of operations. The complete rotation of the plates corresponds to the period of the cycle.

It goes without saying that the invention must not be considered as being limited to the embodiments which have been described and that modifications may be made to them without departing from the scope of the claims.

What we claim is:

1. A mechanical arrangement for the remote control of apparatus driven by means of a compressed fluid, comprising rotative distributors for the compressed fluid, at least one member comprising a plate carrying adjustable actuating lugs for operating said distributors and means for displacing said lugs relatively to the distributors so that the latter turn through a certain angle for the purpose of modifying the distribution of the compressed fluid, the adjustment of the position of the lugs with respect to the member carrying them being capable of modification so as to allow the moment at which the distributors are actuated to be varied as may be desired.

2. An arrangement as claimed in claim 1, in which the member carrying the actuating lugs is movable about an axis parallel to those of the distributors.

3. An arrangement as claimed in claim 1, in which the member carrying the actuating lugs is fixed and the whole of the distributors rotates about an axis parallel to those of the latter.

4. An arrangement as claimed in claim 1, in which the lugs are fixed with respect to the member carrying them.

5. An arrangement as claimed in claim 1, in which the lugs may be displaced with respect to the member carrying them, for example by means of jacks.

6. An arrangement as claimed in claim 1, in which the apparatus to be controlled is a double acting jack and a single distributing valve of the four-way type is provided for supplying the cylinder of the said jack.

7. An arrangement as claimed in claim 1, in which the member carrying the actuating lugs is provided on one of its faces with actuating lugs corresponding to one of the distributors and on its other face with lugs corresponding to a second distributor.

8. An arrangement as claimed in claim 1 which comprises a distributor having a body housing a sleeve inside which is mounted rotatively a core or plug provided with radial and lateral passages, capable of connecting or disconnecting, by means of orifices provided in the sleeve, annular recesses in the body connected to passages for the admission, the exhaust or the utilization of a compressed fluid.

9. A rotary machine adapted to be used in connection with a cyclical operation comprising a rotative plate carrying the different devices necessary for performing the said operation, distributors of compressed fluid of a rotary type for controlling said devices, the said distributors being carried by the said rotative plate, actuating lugs carried by the fixed frame of the machine adapted to actuate the said distributors, and means for causing the said plate to rotate in an intermittent manner.

10. A machine according to claim 9 which comprises rotary distributors carried by the frame of the machine and adapted to be actuated by lugs carried by a plate rotating continuously, the said distributors being capable of being connected to jacks the piston rods of which carry actuating lugs for the distributors mounted on the rotative plate.

No references cited.